(12) United States Patent
Schofalvi

(10) Patent No.: US 9,701,589 B2
(45) Date of Patent: Jul. 11, 2017

(54) PROPPANTS FOR USE IN HYDROFRACKING

(71) Applicant: Karl-Heinz Schofalvi, Hudson, OH (US)

(72) Inventor: Karl-Heinz Schofalvi, Hudson, OH (US)

(73) Assignee: HD PROPPANTS LLC, Hudson, OH (US)

(*) Notice: Subject to any disclaimer, the term of this patent is extended or adjusted under 35 U.S.C. 154(b) by 783 days.

(21) Appl. No.: 14/061,353

(22) Filed: Oct. 23, 2013

(65) Prior Publication Data

US 2014/0113071 A1   Apr. 24, 2014

Related U.S. Application Data

(60) Provisional application No. 61/717,354, filed on Oct. 23, 2012.

(51) Int. Cl.
*C04B 41/45* (2006.01)
*C09K 8/80* (2006.01)

(52) U.S. Cl.
CPC .......... *C04B 41/4543* (2013.01); *C09K 8/805* (2013.01)

(58) Field of Classification Search
None
See application file for complete search history.

(56) References Cited

U.S. PATENT DOCUMENTS

| | | | | | |
|---|---|---|---|---|---|
| 3,492,147 | A | * | 1/1970 | Young | C03C 17/32 427/384 |
| 5,420,174 | A | * | 5/1995 | Dewprashad | C09K 8/685 507/220 |
| 5,837,656 | A | * | 11/1998 | Sinclair | C09K 8/805 166/280.2 |
| 6,632,527 | B1 | * | 10/2003 | McDaniel | B01J 2/20 166/295 |
| 2008/0066910 | A1 | * | 3/2008 | Alary | C09K 8/80 166/280.2 |
| 2011/0278003 | A1 | * | 11/2011 | Rediger | C09K 8/805 166/280.1 |
| 2013/0068460 | A1 | * | 3/2013 | Kumar | E21B 43/267 166/280.2 |
| 2013/0081812 | A1 | * | 4/2013 | Green | C09K 8/805 166/280.1 |

* cited by examiner

*Primary Examiner* — Erma Cameron
(74) *Attorney, Agent, or Firm* — McDonald Hopkins LLC

(57) ABSTRACT

A proppant is formed by a method including inserting a plurality of particles into a heating device, such as a rotary tunnel kiln. The particles are heated at a first temperature within the heating device. A non-epoxy, non-urethane thermoset coating is heated to at least its melting point or dissolved in a solvent or both, and sprayed into the heating device and onto the particles. The particles are heated to a second temperature, higher than the first temperature.

18 Claims, 2 Drawing Sheets

| Catalyst Activity | | | Physical Properties | | | | | Chemicals | | | | | | | | | Particle Size | | | | | | | | |
|---|---|---|---|---|---|---|---|---|---|---|---|---|---|---|---|---|---|---|---|---|---|---|---|---|---|
| ConY | CPF | GPF | SA | MSA | MIPV | ABD | PV | Na | RE | Ni | V | Al2O3 | Fe | Cu | Sb | C | 0-20 | 0-40 | 0-80 | AP5 | CaO | P2O5 | K2O | SiO2 | REO |
| wt% | | | m2/g | m2/g | cc/g | g/cc | cc/g | wt% | wt% | ppm | ppm | wt% | wt% | ppm | ppm | wt% | wt% | wt% | wt% | μm | wt% | wt% | wt% | wt% | wt% |
| 65.5 | 2.3 | 2.8 | 105 | 70 | 0.016 | 0.82 | 0.31 | 0.32 | 1.36 | 2175 | 3921 | 59.62 | 0.92 | 60 | 626 | 0.31 | | | | | 0.16 | 0.12 | 0.07 | 34.40 | 1.59 |
| 65.3 | 2.2 | 2.7 | 106 | 67 | 0.019 | 0.82 | 0.31 | 0.32 | 1.36 | 2155 | 3926 | 59.60 | 0.92 | 47 | 633 | 0.27 | 0.0 | 2.2 | 37.5 | 94.0 | 0.16 | 0.12 | 0.08 | 34.41 | 1.59 |
| 66.0 | 2.2 | 2.5 | 106 | 70 | 0.017 | 0.81 | 0.31 | 0.32 | 1.35 | 2170 | 3934 | 59.55 | 0.92 | 38 | 598 | 0.31 | 0.0 | 1.7 | 34.1 | 98.8 | 0.17 | 0.12 | 0.08 | 34.45 | 1.58 |
| 66.7 | 2.1 | 2.8 | 106 | 71 | 0.016 | 0.82 | 0.32 | 0.34 | 1.36 | 2340 | 3732 | 59.43 | 0.91 | 28 | 599 | 0.29 | 0.0 | 2.0 | 35.4 | 97.2 | 0.15 | 0.11 | 0.07 | 34.5 | 1.60 |
| 66.4 | 2.2 | 3.2 | 108 | 69 | 0.018 | 0.84 | 0.31 | 0.37 | 1.33 | 1941 | 3619 | 59.88 | 0.82 | 38 | 579 | 0.34 | 0.0 | 2.1 | 36.3 | 96.0 | 0.15 | 0.11 | 0.08 | 34.36 | 1.56 |
| 66.7 | 2.1 | 3.2 | 108 | 71 | 0.017 | 0.84 | 0.32 | 0.32 | 1.34 | 1916 | 3547 | 59.91 | 0.81 | 37 | 631 | 0.36 | 0.0 | 2.6 | 40.3 | 90.4 | 0.13 | 0.10 | 0.07 | 34.41 | 1.57 |

| Catalyst Activity | | | Physical Properties | | | | | Chemicals | | | | | | | | Particle Size | | | | | | | |
|---|---|---|---|---|---|---|---|---|---|---|---|---|---|---|---|---|---|---|---|---|---|---|---|
| ConY | CPF | GPF | SA | MSA | MiPV | ABD | PV | Na | RE | Ni | V | Al2O3 | Fe | Cu | Sb | C | 0-20 | 0-40 | 0-80 | APS | CaO | P2O5 | K2O | SiO2 | REO |
| wt% | | | m2/g | m2/g | cc/g | g/cc | cc/g | wt% | wt% | ppm | ppm | wt% | wt% | ppm | ppm | wt% | wt% | wt% | wt% | μm | wt% | wt% | wt% | wt% | wt% |
| 65.5 | 2.3 | 2.8 | 105 | 70 | 0.016 | 0.82 | 0.31 | 0.32 | 1.36 | 2175 | 3921 | 59.62 | 0.92 | 60 | 626 | 0.31 | 0.0 | 2.2 | 37.5 | 94.0 | 0.16 | 0.12 | 0.07 | 34.40 | 1.59 |
| 65.3 | 2.2 | 2.7 | 106 | 67 | 0.019 | 0.82 | 0.31 | 0.32 | 1.36 | 2155 | 3926 | 59.60 | 0.92 | 47 | 633 | 0.27 | 0.0 | 1.7 | 34.1 | 98.8 | 0.16 | 0.12 | 0.08 | 34.41 | 1.59 |
| 66.0 | 2.2 | 2.5 | 106 | 70 | 0.017 | 0.81 | 0.31 | 0.32 | 1.35 | 2170 | 3934 | 59.55 | 0.92 | 38 | 598 | 0.31 | 0.0 | 2.0 | 35.4 | 97.2 | 0.17 | 0.12 | 0.08 | 34.45 | 1.58 |
| 66.7 | 2.1 | 2.8 | 106 | 71 | 0.016 | 0.82 | 0.32 | 0.34 | 1.36 | 2340 | 3732 | 59.43 | 0.91 | 28 | 599 | 0.29 | 0.0 | 2.0 | 35.4 | 97.2 | 0.15 | 0.11 | 0.07 | 34.5 | 1.60 |
| 66.4 | 2.2 | 3.2 | 108 | 69 | 0.018 | 0.84 | 0.31 | 0.37 | 1.33 | 1941 | 3619 | 59.88 | 0.82 | 38 | 579 | 0.34 | 0.0 | 2.1 | 36.3 | 96.0 | 0.15 | 0.11 | 0.08 | 34.36 | 1.56 |
| 66.7 | 2.1 | 3.2 | 108 | 71 | 0.017 | 0.84 | 0.32 | 0.32 | 1.34 | 1916 | 3547 | 59.91 | 0.81 | 37 | 631 | 0.36 | 0.0 | 2.6 | 40.3 | 90.4 | 0.13 | 0.10 | 0.07 | 34.41 | 1.57 |

FIG. 1

*All values for Sample Catalyst ESC-83*

| Dated (2011) | MAT wt% | Total SA m²/g | Ni ppm | V ppm | NA wt% | Sb ppm | Fe2O3 wt% | Al2O3 Wt% | CaO wt% | Cu ppm | Fe wt% | K2O wt% | MgO ppm | P2O5 wt% | Pb ppm | TiO2 wt% | ZnO ppm | Carbon wt% | ABD g/cc | Pore Vol cc/g | 0-20 µ% | 0-40 µ% | 0-60 µ% | 0-80 µ% | 40-80 µ% | APS Micron |
|---|---|---|---|---|---|---|---|---|---|---|---|---|---|---|---|---|---|---|---|---|---|---|---|---|---|---|
| 28Aug | 72 | 117 | 1647 | 3511 | 0.25 | 757 | 2.32 | 48.3 | 0.139 | 57 | 0.69 | 0.10 | 20261 | 0.123 | 34 | 1.01 | 183 | 0.04 | 0.82 | 0.37 | 0 | 4 | 29 | 58 | 54 | 74 |
| 24 Aug | 69 | 116 | 1772 | 3758 | 0.24 | 764 | 2.46 | 47.8 | 0.146 | 59 | 0.70 | 0.1 | 22183 | 0.124 | 35 | 0.99 | 191 | 0.05 | 0.83 | 0.37 | 0 | 5 | 28 | 55 | 50 | 75 |
| 21Aug | 67 | 115 | 1821 | 3844 | 0.25 | 750 | 2.43 | 48.2 | 0.146 | 60 | 0.70 | 0.10 | 23347 | 0.122 | 35 | 1.00 | 195 | 0.04 | 0.82 | 0.38 | 0 | 3 | 25 | 53 | 50 | 78 |
| 17Aug | 65 | 118 | 1847 | 3783 | 0.25 | 745 | 2.47 | 48.0 | 0.141 | 60 | 0.69 | 0.10 | 19772 | 0.123 | 36 | 0.98 | 199 | 0.03 | 0.83 | 0.38 | 0 | 4 | 27 | 54 | 49 | 77 |
| 14Aug | 66 | 119 | 1852 | 3841 | 0.25 | 781 | 2.46 | 47.6 | 0.143 | 60 | 0.68 | 0.10 | 21320 | 0.120 | 35 | 0.97 | 201 | 0.04 | 0.83 | 0.38 | 0 | 3 | 26 | 54 | 50 | 77 |
| 10Aug | 68 | 118 | 1860 | 3850 | 0.25 | 711 | 2.51 | 47.3 | 0.146 | 62 | 0.68 | 0.10 | 23049 | 0.122 | 37 | 0.96 | 207 | 0.05 | 0.83 | 0.37 | 0 | 3 | 26 | 54 | 51 | 77 |
| 07Aug | 67 | 118 | 1825 | 3793 | 0.26 | 704 | 2.54 | 47.2 | 0.143 | 61 | 0.67 | 0.10 | 23887 | 0.120 | 36 | 0.96 | 198 | 0.03 | 0.84 | 0.38 | 0 | 4 | 26 | 52 | 48 | 78 |
| 03Aug | 69 | 120 | 1768 | 3643 | 0.25 | 668 | 2.58 | 46.8 | 0.140 | 62 | 0.65 | 0.09 | 23789 | 0.118 | 37 | 0.95 | 193 | 0.05 | 0.84 | 0.37 | 0 | 3 | 23 | 51 | 49 | 79 |
| 31Jul | 70 | 121 | 1791 | 3628 | 0.25 | 642 | 2.62 | 46.6 | 0.137 | 64 | 0.66 | 0.09 | 23290 | 0.116 | 33 | 0.94 | 196 | 0.04 | 0.84 | 0.38 | 0 | 4 | 26 | 52 | 48 | 78 |
| 27Jul | 72 | 123 | 1818 | 3715 | 0.28 | 699 | 2.78 | 47.1 | 0.141 | 67 | 0.67 | 0.09 | 27300 | 0.124 | 37 | 0.92 | 205 | 0.03 | 0.84 | 0.38 | 0 | 2 | 22 | 50 | 48 | 80 |
| 24Jul | 68 | 127 | 1720 | 3513 | 0.27 | 699 | 2.85 | 46.6 | 0.137 | 66 | 0.66 | 0.09 | 25785 | 0.121 | 35 | 0.90 | 199 | 0.04 | 0.82 | 0.38 | 0 | 3 | 23 | 51 | 49 | 79 |

FIG. 2

PROPPANTS FOR USE IN HYDROFRACKING

CROSS REFERENCE TO RELATED APPLICATION

This application claims priority to U.S. Provisional Patent Application Ser. No. 61/717,354 titled "PROPPANTS FOR USE IN HYDROFRACKING," filed on Oct. 23, 2012, which is hereby incorporated in its entirety.

FIELD OF INVENTION

The present invention relates generally to a method of manufacturing and processing for the coating of ceramic particles and, more particularly, for thermosetting polymeric coatings on ceramic particulates and/or agglomerated particles.

BACKGROUND

Known products and methods for production of coated aluminosilicates for use as proppants are comprised of mainly coated crystalline quartz (sand) and sintered bauxite or alumina that has been formed into hollow microspheres to reduce its apparent density. These known products and methods are deficient because they are expensive and cumbersome to produce in the form most effective for use as a proppant.

Therefore, there is a need for an improved method of producing coated pre-sintered or calcined ceramic particles with a thermosetting resin.

SUMMARY

A method of manufacturing and processing for the coating of ceramic particles is generally presented. The method includes inserting a plurality of particles into a heating device, such as a rotary tunnel kiln. The particles are heated at a first temperature, preferably between 100° and 200° C., in the heating device. A non-epoxy thermoset coating is heated to at least its melting point and sprayed into the heating device and onto the particles. The particles are heated to a second temperature, higher than the first temperature, preferably between 300° and 400° C.

The method may comprise use of an aluminosilicate ceramic with a composition of silica and alumina. The silica amounts may range between about 25% and about 85%, but in an embodiment range from about 45% to about 55%. The aluminosilicate composition may also contain between about 20% to 75% alumina, and in an embodiment may contain 45% to about 55% alumina. Aluminosilicate particulates that are obtained from spent catalyst ceramics used in the cracking of hydrocarbons may be used in the composition. The particular source of the aluminosilicate composition determines its chemistry, crystalline or amorphous state, morphology, apparent density and trace ingredients.

DESCRIPTION OF THE DRAWINGS

Operation of the invention may be better understood by reference to the following detailed description taken in connection with the following illustrations, wherein:

FIG. 1 is a first data table providing particle size and APS information.

FIG. 2 is a second data table providing particle size and APS information.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

The term "ceramic" is used herein to refer to an inorganic solid material. The ceramic particulates may comprise oxides (e.g., alumina, ceria, zirconia), non-oxides (e.g., carbide, boride, nitride, silicide), or mixtures of two or more thereof. The ceramic particulates may be in an "as mined" form, or may be in a treated or processed form, for example, by sintering, claiming, and the like.

The polymer may comprise a thermoset polymer. Gelation is a typical characteristic of thermoset polymers and a phenomenon that may take place during thermosetting polymer cure reactions. It corresponds to the incipient formation of a network. Gelation may occur at a well-defined stage in the course of the cure reaction and depends on the stoichiometry, functionality, and reactivity of reactants, and temperature. Prior to gelation, the polymer may be dissolved in appropriate solvents. After the gel point, however, the network may not dissolve but swell in certain solvents. Soluble small and branched molecules may be present. The curing polymer may contain sol as well as gel fractions.

The ceramic particulate may comprise a frangible material. The ceramic particulates may comprise aluminum, zirconium, silicon, magnesium, calcium, boron, silicon, carbide, oxides thereof, or mixtures of two or more thereof. The ceramic particulates may be in the form of platelets, flakes, hollow spheres, solid spheres, rods, cones, hollow irregular shaped particulates, solid irregular shaped particulates, coated particulates, laminar particulates, laminated particulates, composite particulates, or a mixture of two or more thereof.

The ceramic particulates may comprise aluminosilicate material from spent hydrocarbon cracking catalysts, hollow alumino-silicate spheres, silicon carbide flakes, natural mica flakes, chemically modified mica flakes, aluminum diboride flakes, boron nitride platelets, sodium silicate coated ceramic spheres, potassium ion modified mica flakes, alumina flakes, hollow alumina spheres, zirconia particulates, hollow zirconia spheres, sol-gel or aerosol produced silica, or a mixture of two or more thereof.

The ceramic particulates may be coated with one or more layers of sodium silicate, silica, alumina, alumino-silica, zirconia, titania, calcia, magnesia, or mixtures of two or more thereof.

A spent aluminosilicate catalyst having a particle size less than 20 microns and generally greater than 1 micron may be used in the composition described herein. The first step is to charge the spent aluminosilicate into the rotary furnace at ambient temperature. The second step is to add the pitch neat or as a formulated composition with processing profile (heat ramps, processing speed, processing time, crosslinking catalysts) to produce the ideal shape and sized agglomerate for the final step of sintering.

In the first application of use as a proppant for hydrofracking, it is desirable to have the proppants in a spherical or semi-spherical shape to reduce the pumping pressure required. It is also desirable to use ceramic particles that have a crush strength greater than 7500 psi (standard crush tests report results as what percent survives a certain psi compression) to qualify as a "high performance" proppant that has the capability of being used in wells below 5000 feet. Furthermore, a crush strength exceeding 7500 psi makes the propannt superior to sand which has crush strengths below 3000 psi. When sand disintegrates, the smaller particles clog the shale fissures and prevent efficient release of the valuable gas, oil and hydrocarbons.

The next step to form a proppant is the agglomeration of the randomly shaped aluminosilicate particles into larger spherical or semi-spherical hollow or semi-hollow spheres. Some currently employed methods teach multiple processing steps to achieve the tasks of: ceramic formation, particle modification, use of a aqueous polymeric binder with a specialized mixer to create agglomerated spheres, a drying apparatus with drying procedure, a sintering procedure to give the agglomerated sphere more strength and finally, a procedure to coat the agglomerated sphere with an external coat and in some methods, applying both an external coat and an internal coat of a thermosetting resin. Other methods teach using a mixture of thermoplastic coat and thermosetting coats for the internal and external walls of the agglomerate.

Such previous methods may be improved by using a single processing step to achieve the following requirements to produce a high performance proppant; agglomeration, sphere formation, coating (both internal and external), and proper sizing and sintering.

The procedure to accomplish these five tasks is contemplated in a general process scheme. A rotary tunnel kiln may be used as the processing unit to facilitate mixing, agglomerate formation, drying, resin coating/curing and sintering. As understood by a person of ordinary skill in the art, a rotary tunnel kiln is a common piece of processing equipment used in the production of cement. No major modifications need to be made to the kiln to produce the desired results for this application.

In an embodiment, a non-epoxy, non-urethane thermoset coating, such as a coal tar pitch or furfuryl alcohol, may be used as the binder system that simultaneously coats the particles and agglomerates them in a way which also enlarges the agglomerated particle size. For example, Coal Tar Pitch from Koppers Industries of Morgantown, W. Va. may be used as the binder system. Alternatively, petroleum pitch such as Koppers KP-100 may be used. These two pitch sources can also be combined or formulated with surface active agents, lubricants, solvents or other modifiers including inorganic and/or carbon and graphitic additives to achieve the overall goals of the proppant manufacturing. For example, a furfuryl alcohol coating may be dissolved in an isopropyl alcohol solvent and a coal tar pitch coating may be dissolved in a tetrahydrofuran solvent. During the processing, the viscosity of the binder may also require modification. Pitch offers many ways to modify the viscosity using solvents or water to dilute the mixtures. The pitch can also be purchased with very low water content which produces higher viscosities. The pitch products also offer a wide degree of flexibility in how they can be introduced to the ceramic particles inside the rotary kiln. For example, the coating may be heated to a temperature, such as at least a melting temperature or dissolved in a solvent, then sprayed into the rotary kiln and onto the particles. In an embodiment, the pitch material will be sprayed into the kiln while the particles are in motion at slow speed, such as 5-10 rpm, and low temperatures, such as 40-60 Celsius.

Once the pitch and or formulated pitch system is applied to the particles, the process will control the agglomeration with a combination of speed, viscosity, solvent choice, solvent %, temperature (static or dynamic) and processing time. Once agglomerated, the rotary tunnel kiln will run a drying cycle at an estimated temperature of 60-100 C. Speed of the turn as well as aspect ratio of the tunnel dimensions will contribute to the processing parameter control that will be developed to insure final proppant characteristics. After drying step is complete, the temperature will be raised in a controlled fashion to initiate the curing of the thermosetting properties inherent to pitch. The overall goal is to this have a coating that saturates the pores of the agglomerate to produce an external coating that also coats portions of the interior shell. A sintering step is also contemplated in this embodiment. Once agglomerated particles are formed, dried, coated and cured; the particles can be sintered to a temperature above 600 C to produce a hardened particle capable of fulfilling the demands of a high performance proppant.

In an embodiment, the targeted characteristics of the agglomerated proppant particle (APP) are as follows:

The APP should be of a size range of 20-1000 microns with a preferred size range of 400-600 microns in the as wet-formed state. The APP's will undergo shrinkage during thermal processing reducing their size to a range of 15-35% with a target average of 25%. So the final sintered targeted size range is 300-450 microns.

The APP should have a final apparent density in the range of 2.0 to 3.1 g/cc. In the preferred embodiment, a range of 2.6-2.9 g/cc is envisioned.

The APP should have a crush strength where 10% or less is crushed at a compression force of 7500 psi.

The APP should have a pitch based thermoset coating which has a range of 0.1 to 15.0% of the weight density of the APP. In the preferred embodiment, a coating weight of 0.8-4.4% is envisioned.

Once the APP is completely processed, the material should be free flowing and not block or stick. It is recommended that that the material be kept in a low moisture atmosphere until used to ensure flowability.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A method of manufacturing a proppant comprising:
inserting a plurality of particles into a heating device;
heating said particles to a first temperature;
heating a non-epoxy, non-urethane thermoset coating to at least its melting point, or dissolving said coating material in a solvent;
spraying said melted or dissolved non-epoxy, non-urethane thermoset coating into said heating device to coat at least a portion of said particles;
heating said particles to a second temperature higher than said first temperature.

2. The method of claim 1, wherein said coating comprises a carbon-based thermoset coating.

3. The method of claim 1, wherein said coating comprises furfuryl alcohol.

4. The method of claim 1, wherein said heating device is a rotary tunnel kiln.

5. The method of claim 1, wherein said first temperature is between 100 and 200 degrees Celsius.

6. The method of claim 1, wherein said second temperature is between 300 and 400 degrees Celsius.

7. The method of claim 1, wherein said non-epoxy, non-urethane thermoset coating is sprayed into said heating device while said particles are moving.

8. The method of claim 7, wherein the particles are moving at a speed of between 5 and 10 miles per hour.

9. The method of claim 1, wherein said non-epoxy, non-urethane thermoset coating is sprayed into said heating device while said particles are at a temperature between 40 and 60 degrees Celsius.

10. The method of claim 1, wherein said particles include ceramic particles.

11. The method of claim 10, wherein the ceramic particles are selected from the group consisting of: aluminosilicate material from spent hydrocarbon cracking catalysts, hollow alumino-silicate spheres, silicon carbide flakes, natural mica flakes, chemically modified mica flakes, aluminum diboride flakes, boron nitride platelets, sodium silicate coated ceramic spheres, potassium ion modified mica flakes, alumina flakes, hollow alumina spheres, zirconia particulates, hollow zirconia spheres, sol gel or aerosol produced silica, or a mixture of two or more thereof.

12. The method of claim 1, wherein said non-epoxy, non-urethane thermoset coating includes petroleum pitch or coal tar pitch or a combination thereof.

13. The method of claim 1 further comprising adjusting a viscosity of said non-epoxy, non-urethane thermoset coating before coating at least a portion of the particles.

14. The method of claim 1, wherein the proppant produced by said method are agglomerated proppant particles having a size range of 400-600 microns in a wet-formed state.

15. The method of claim 1, wherein the proppant produced by said method have a final apparent density in the range of 2.0 to 3.1 g/cc.

16. The method of claim 1, wherein at least 90% the proppant produced by said method have a crush strength greater than 7500 psi.

17. The method of claim 1, wherein the coating is produced on at least one of: an external portion of the particles, an internal portion of the particles, an external portion of agglomerates formed by the particles, and an interior shell of agglomerates formed by the particles.

18. The method of claim 1, wherein said non-epoxy, non-urethane thermoset coating is dissolved before spraying to coat at least a portion of the particles.

* * * * *